(12) United States Patent
Chou et al.

(10) Patent No.: US 10,871,454 B2
(45) Date of Patent: Dec. 22, 2020

(54) INSPECTION METHOD AND APPARATUS

(71) Applicant: TAIWAN SEMICONDUCTOR MANUFACTURING CO., LTD., Hsinchu (TW)

(72) Inventors: Chung-Pin Chou, Hsinchu (TW); Yu-Liang Tseng, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 16/278,083

(22) Filed: Feb. 16, 2019

(65) Prior Publication Data

US 2020/0264111 A1     Aug. 20, 2020

(51) Int. Cl.
*G01N 21/95* (2006.01)
*G06T 7/00* (2017.01)
*G01N 21/88* (2006.01)

(52) U.S. Cl.
CPC ..... *G01N 21/9503* (2013.01); *G01N 21/8806* (2013.01); *G06T 7/0004* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 5,017,798 A * | 5/1991 | Murakami | G01N 21/94 250/559.06 |
| 7,038,771 B2 | 5/2006 | Smedt | |
| 8,087,799 B2 * | 1/2012 | Hahn | G01N 21/8806 362/235 |
| 2004/0207836 A1 * | 10/2004 | Chhibber | G01N 21/9501 356/237.4 |
| 2009/0080761 A1 * | 3/2009 | Barker | G06K 7/10594 382/145 |

* cited by examiner

*Primary Examiner* — Michelle M Iacoletti
(74) *Attorney, Agent, or Firm* — Maschoff Brennan (57) ABSTRACT

A method includes generating a primary radiation beam from a radiation source; splitting the primary beam into a first radiation beam and a second radiation beam; directing the first radiation beam onto a front side of a wafer; directing the second radiation beam onto a back side of a wafer; generating an image of the front side of the wafer by receiving a reflection of the first radiation beam reflected from the wafer; and generating an image of the back side of the wafer by receiving a reflection of the second radiation beam reflected from the wafer.

20 Claims, 5 Drawing Sheets

INSPECTION METHOD AND APPARATUS

BACKGROUND

Fabricating semiconductor devices, such as logic and memory devices, typically includes processing a substrate such as a semiconductor wafer using a large number of semiconductor fabrication processes to form various features and multiple levels of the semiconductor devices. For example, deposition process is a semiconductor fabrication process that involves forming one or more material layers on the semiconductor wafer. Additional examples of semiconductor fabrication processes include, but are not limited to, chemical-mechanical polishing (CMP), etch, lithography, and ion implantation.

Inspection processes are used at various steps during a semiconductor manufacturing process to detect defects on wafers to promote higher yield in the manufacturing process and thus higher profits. However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary since even relatively small defects may cause unwanted aberrations in the semiconductor devices. Furthermore, as design rules shrink, semiconductor manufacturing processes may be operating closer to the limitations on the performance capability of the processes, and smaller defects can have an impact on the electrical parameters of the device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
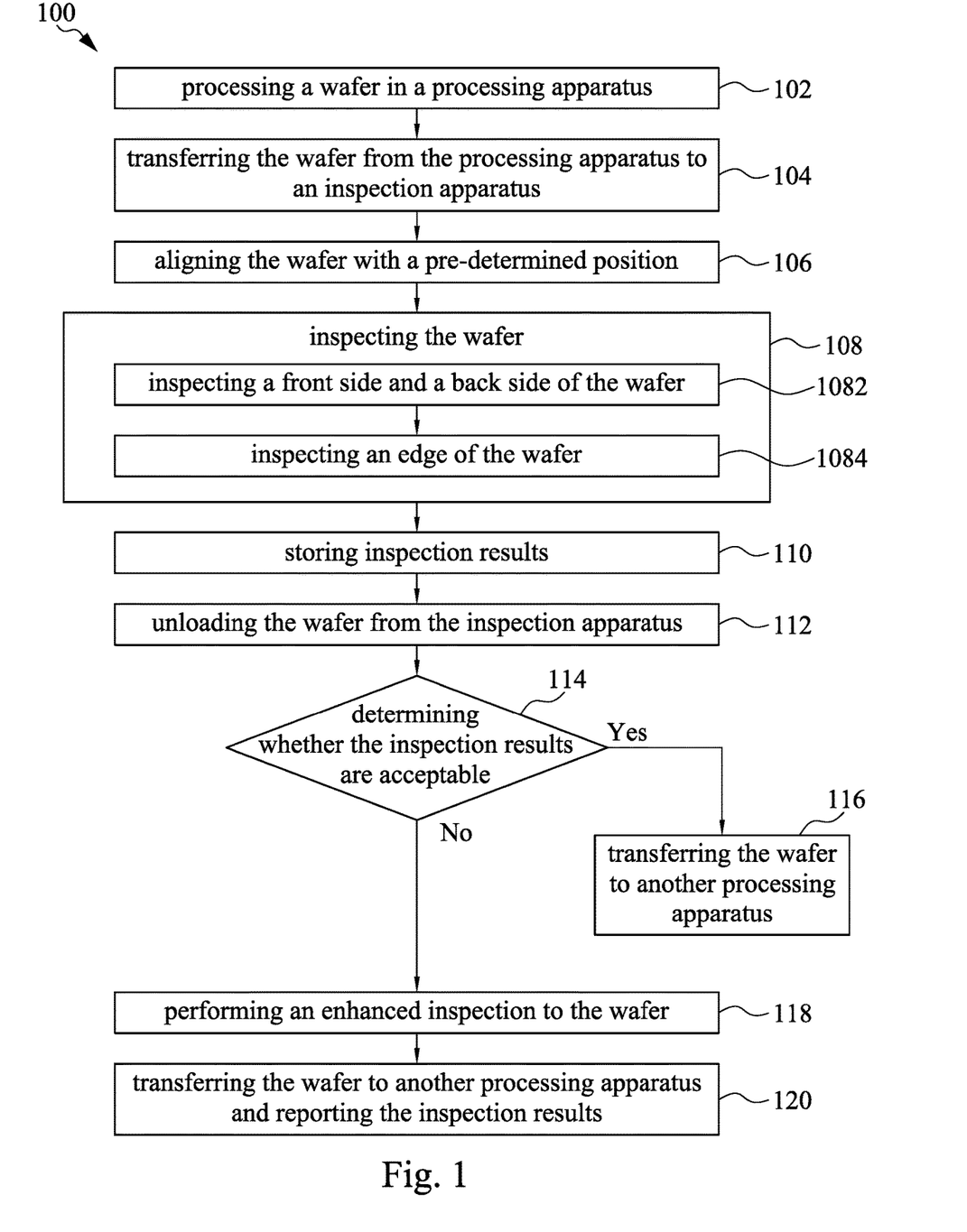
FIG. 1 is a method for operating an inspection apparatus in accordance with some embodiments of the present disclosure.
Figure 2:
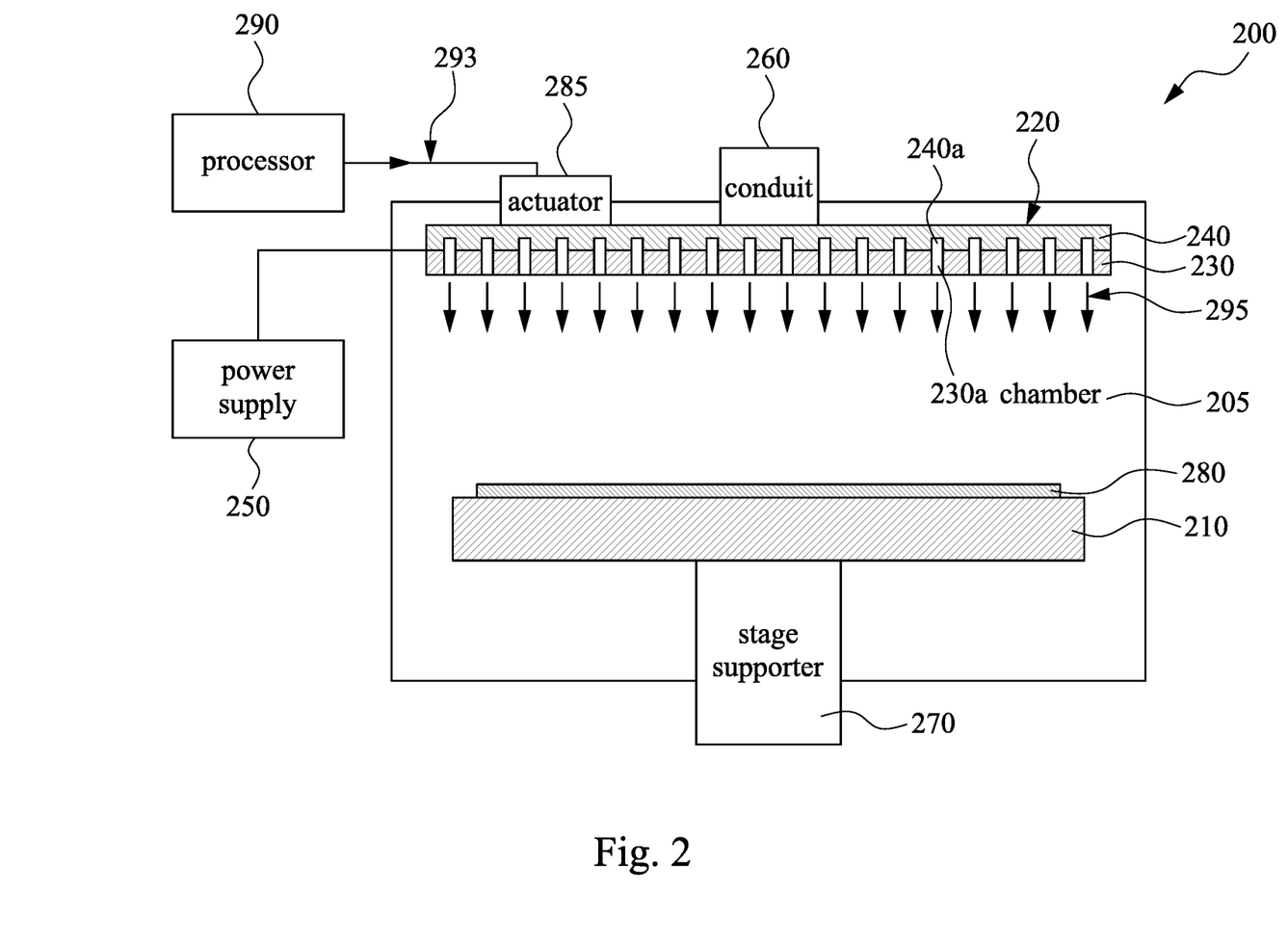
FIG. 2 is a processing apparatus in accordance with some embodiments of the present disclosure.

FIG. 1 is a method for operating an inspection apparatus in accordance with some embodiments of the present disclosure. Referring to FIG. 1, the method 100 begins at operation 102 where a wafer is processed in a processing apparatus. Referring to FIG. 2, shown there is a processing apparatus 200. In some embodiments, the processing apparatus 200 includes a chamber 205, a stage 210, a gas distribution apparatus 220, a power supply 250, a conduit 260, a stage supporter 270, an actuator 285 and a processor 290. The chamber 205 may be surrounded by a housing 206 made of material that is inert to the various process materials. In some embodiments, the housing 219 may be steel, stainless steel, nickel, aluminum, alloys of these, or combinations thereof.

The stage 210 is disposed within the chamber 205. The gas distribution apparatus 220 may be disposed within or on the chamber 205. A wafer W is disposed on the stage 210. The gas distribution apparatus 220 is disposed over the stage 210. In some embodiments, the gas distribution apparatus 220 may include a first plate 230 and a second plate 240. For example, the first plate 230 includes a plurality of first openings 230a. The second plate 240 includes a plurality of second openings 240a. The second plate 240 is disposed over the first plate 230. The power supply 250 is coupled to the gas distribution apparatus 220. The power supply 250 can be coupled to the first plate 230, the second plate 240 or both of them, for example. The gas distribution conduit 260 is connected to the gas distribution apparatus 220. The stage supporter 270 is connected to the stage 210. The processor 290 is coupled to the actuator 285 to move the plates 230 and 240 relative to each other, as described in more detail below. For example, the actuator 285 can be coupled to the first plate 230, the second plate 240 or both of them.

The chamber 205 can be an etch apparatus, chemical vapor deposition (CVD) chamber, physical vapor deposition (PVD) chamber, atomic layer deposition (ALD) chamber, plasma enhanced chemical vapor deposition (PECVD) chamber, liquid source misted chemical deposition (LSMCD) chamber, furnace chamber, single wafer furnace chamber or other chamber in which chemical, gas or plasma is provided (collectively, "Semiconductor Processing Chamber").

The wafer W can be, for example, a silicon substrate, a III-V compound substrate, a glass substrate, a liquid crystal display (LCD) substrate, a printed circuit board (PCB) or any other substrate similar thereto. In some embodiments, the wafer W can be a blank substrate or include a variety of integrated devices or circuits, or layers for forming such, (not shown) thereon, for example.

The conduit 260 is adapted to deliver a gas 295 to the gas distribution apparatus 220 for introduction into the chamber 205 by way of the openings 230a and 240a. The stage 210 is adapted to accommodate and hold the wafer W. In some embodiments, the stage 210 may include an electrostatic chuck, vacuum system, clamp or other apparatus that is able to keep the wafer W substantially on the stage 210. In some embodiments, the stage 210 also includes a bottom electrode coupled to a power supply (not shown) so as to enhance plasma within the chamber 205. The stage supporter 270 is connected to and supports the stage 210 while a process is executed. In some embodiments, the stage supporter 270 includes a conduit (not shown) connected to an exhaust pump (not shown) to exhaust gases or plasmas within the chamber 205. The gas 295 can be, for example, a pure chemical gas, a mixed chemical gas, a mist or moisture of chemical, an ionized gas, liquid, or other type of chemical. The gas 295 is provided in the chamber 205 by way of the openings 230a and 240a.

The power supply 250 can be, for example, a radio frequency (RF) power supply or other power supply that is adapted to provide a high voltage sufficient to ionize the gas 295 provided from the gas distribution apparatus 220 and to generate plasma in the chamber 205, as those in the art will understand. In some embodiments, the processing apparatus 200 is a single wafer furnace apparatus. For such embodiments, the power supply 250 can be eliminated, because generation of plasma is not required. One skilled in the art is readily able to select the chamber 205, the stage 210, the gas distribution apparatus 220, the power supply 250, the conduit 260 and/or the stage supporter 270 to provide a desired processing apparatus 200.

In some embodiments, the processor 290 is coupled to the actuator 285 to control the relative orientation of the plates 230 and 240. The actuator 285 is coupled to the gas distribution apparatus 220. The actuator 285 can be, for example, a motor driven device for moving the plates relative to one another. A multitude of possible configurations are envisioned for accomplishing movement of the plates 230 and 240 relative to one another. In some embodiments where the plates 230 and 240 are circular, the actuator 285 includes a motor (not shown) that drives a shaft coupled to one of the plates 230 and 240. In response to a control signal 293 from the processor 290, the motor drives the shaft a predetermined angular displacement (i.e., a predetermined number of degrees) to change the relative orientation of the plates 230 and 240. In some alternative embodiments, no processor or motor are provided and the plates 230 and 240 can be reoriented manually in accordance with predetermined guidelines for a desired gas distribution.

The actuator 285 is coupled to the first plate 230, the second plate 240 or both, for example. In some embodiments, more than one actuator 285 is provided. The actuator 285 may be located at various locations and either partially within or outside of the chamber 205. One skilled in the art can readily select the number, type and location of the actuator 285 to perform the dual orientation function.

As noted above, the processor 290 is coupled to the actuator 285. The processor 290 sends the control signal 293 to the actuator 285 to control a relative orientation of the first plate 230 and the second plate 240 so as to control the overlaps of the first openings 230 a and the second openings 240 a according to a predetermined recipe. The predetermined recipe tends to form a desired gas distribution pattern within the chamber 205. The recipe can be, in its basic form a correlation between a desired gas distribution and an angular, horizontal, vertical or other position of a shaft or other means that is coupled to the plate or plates to provide movement thereof. The gas distribution pattern is provided by controlling the dimensions of the overlaps of the first openings 230a and the second openings 240a. The processor 290 can be, for example, a central processing unit (CPU), a microprocessor, a programmable logic control unit, a computer or other device or system that is adapted to control the respective movement between the first plate 230 and the second plate 240 and that has access to recipe storage.

Figure 3:
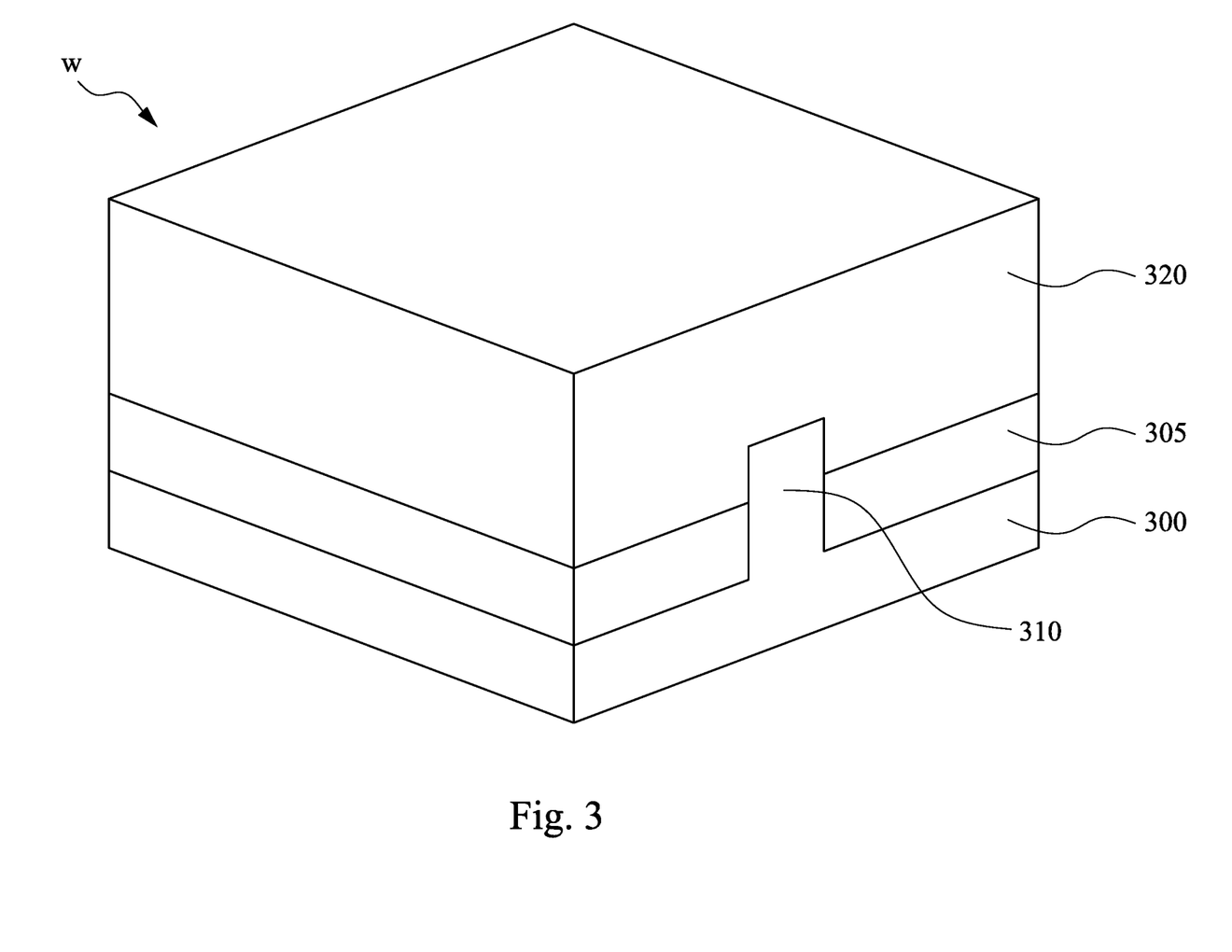
FIG. 3 is a wafer in accordance with some embodiments of the present disclosure.

Reference is made to FIG. 3. Shown there is an example of the wafer W described in FIG. 2. At the beginning where the wafer W is transferred into the chamber 205 of the processing apparatus 200, the wafer W may include a semiconductor substrate 300 having a semiconductor fin 310. In some embodiments, the semiconductor material of the semiconductor substrate 300 and the semiconductor fin 310 may include silicon; germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. The wafer W further includes an isolation structure 305 over the semiconductor substrate 300 and adjacent to the semiconductor fin 310. The isolation structure 305 can be referred to as a shallow trench isolation (STI) structure. In some embodiments, the isolation structure 305 is made of silicon oxide, silicon nitride, silicon oxynitride, fluoride-doped silicate glass (FSG), or other low-K dielectric materials.

In some embodiments, the processing apparatus 200 is a deposition apparatus that may be utilized to form a gate layer 320 over the semiconductor substrate 300 of the wafer W and across the semiconductor fin 310. In some embodiments, the gate layer 320 may include polycrystalline-silicon (poly-Si), poly-crystalline silicon-germanium (poly-SiGe), metallic nitrides, metallic silicides, metallic oxides, or metals. The gate layer 320 may be formed by CVD, PVD, ALD, PECVD, LSMCD, or other suitable deposition process. It is noted that the example shown in FIG. 3 is merely used to explain, the processing apparatus 200 may be utilized to form other desired layers over the semiconductor substrate 300.

In some other embodiments, the wafer W may include one or more layers formed upon the semiconductor substrate 300. For example, such layers may include, but are not limited to, a resist, a dielectric material, a conductive material, and a semiconductive material. Many different types of such layers may be applied, and the term wafer as used herein is intended to encompass a wafer including various types of such layers.

One or more layers formed on a wafer may be patterned or unpatterned. For example, a wafer may include a plurality of dies, each having repeatable patterned features. Formation and processing of such layers of material may ultimately result in completed devices. Many different types of devices such as integrated circuits (ICs) may be formed on a wafer, and the term wafer as used herein is intended to encompass a wafer on which any type of device known in the art is being fabricated.

Although embodiments are described herein with respect to wafer, it is to be understood that the embodiments may be used for another specimen such as a reticle, which may also be commonly referred to as a mask or a photomask. Many different types of reticles are known in the art, and the terms "reticle", "mask", and "photomask" as used herein are intended to encompass various types of reticles.

In some embodiments where the processing apparatus 200 is an etching apparatus, the processing apparatus 200 may be utilized to remove and/or partially remove a surface layer from the wafer W. In some other embodiments where the processing apparatus 200 is a lithography apparatus, the processing apparatus 200 may be utilized to provide desired patterns on wafer W by transferring a mask pattern defined by a mask.

Figure 4:
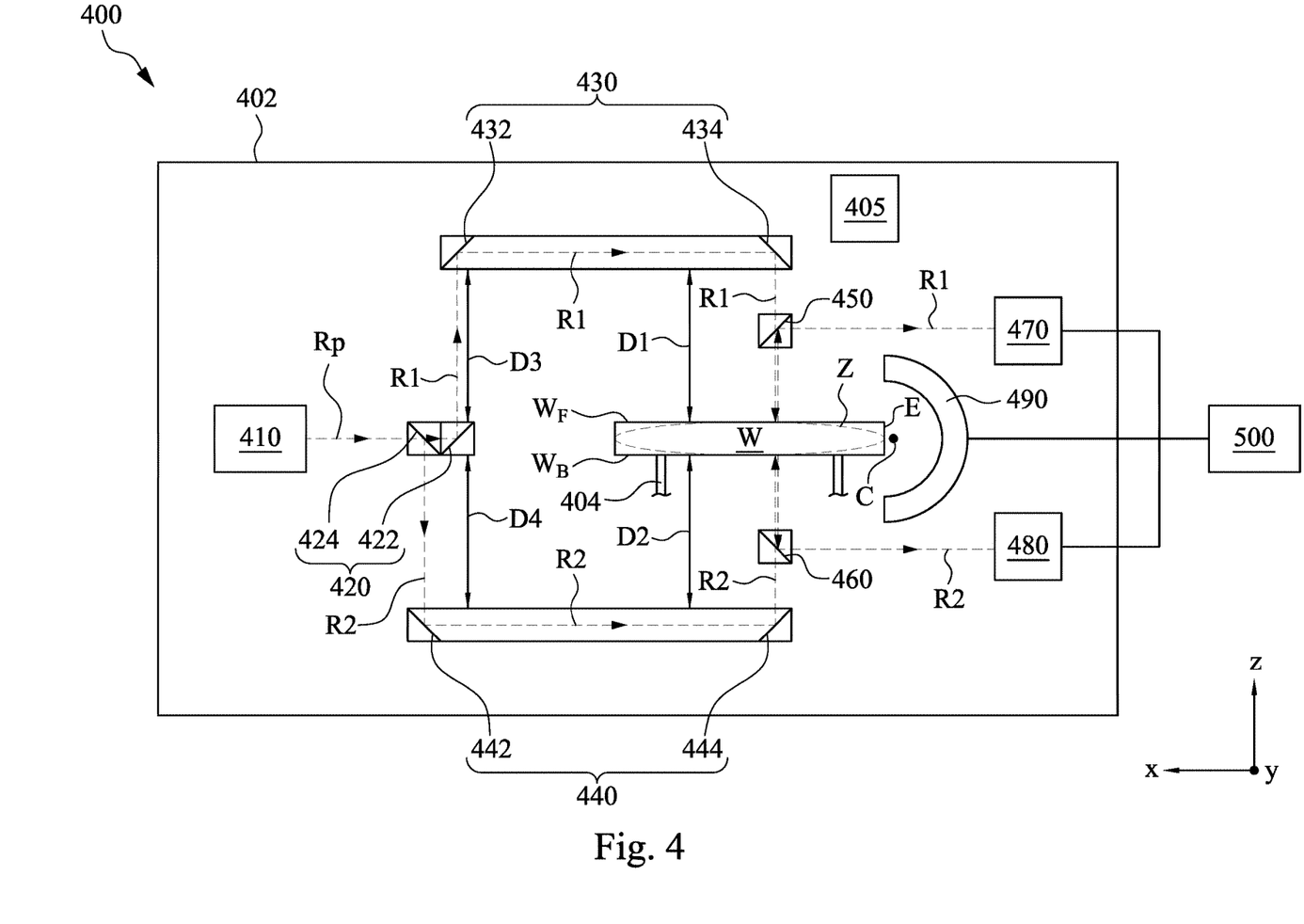
FIG. 4 is an inspection apparatus in accordance with some embodiments of the present disclosure.

Referring back to FIG. 1, the method 100 proceeds to operation 104 where the wafer is transferred from the processing apparatus to an inspection apparatus. After the wafer W undergo the process described in FIGS. 1-3, the wafer W is transferred from the processing apparatus 200 described in FIG. 2 to the inspection apparatus 400 shown in FIG. 4. In FIG. 4, in some embodiments, the inspection apparatus 400 includes a housing 402. For example, the housing 206 may be made of steel, stainless steel, nickel, aluminum, alloys of these, or other suitable material. In some embodiments, the housing 206 forms a closed space held under vacuum (e.g., at a pressure of less than $10^{-2}$ mbar). Stated another way, the gas environment inside the housing 206 has a lower atmosphere pressure than the gas environment outside the housing 206.

The inspection apparatus may 400 include a plurality of supporters 404 utilized to hold the wafer W. In some embodiments, the supporters 404 define a wafer occupiable zone Z and may be moved to receive the wafer W. In greater detail, the wafer W may be disposed on the top surface of the supporters 404, in which each of the supporters 404 includes a tube exposed from the top surface of the supporter 404. Meanwhile, a vacuum source connected to the tube inside the supporter 404 is actuated, so as to remove a gas from the tube to provide a suction force to hold the wafer W on the supporters 404 by vacuum pressure. After the wafer W is held on the supporters 404, the top surface and the sidewall of the wafer W is substantially free from coverage, and a majority portion of the bottom surface of the wafer W that is not in contact with the supporters 404 is free from coverage.

Referring back to FIG. 1, the method 100 proceeds to operation 106 where the wafer is aligned to a pre-determined position. In some embodiments, the supporters 404 of the inspection apparatus 400 may is connected to a pre-aligner 405. The pre-aligner 405 may be configured to alter a position of wafer W. For example, the pre-aligner 405 may be configured to alter a position of the wafer W by moving the supporters 404 such that the orientation of wafer W may be substantially placed at a desired position. Alternatively, the pre-aligner 405 may be configured to detect an alignment mark formed on the wafer W and to alter a position of the wafer W such that a position of the alignment mark may be substantially the same as a predetermined position.

Referring back to FIG. 1, the method 100 proceeds to operation 108 where the wafer is inspected. In some embodiments, the operation 108 includes operations 1082 and 1084. In some embodiments, the operation 1082 includes inspecting a front side and a back side of the wafer. Referring to FIG. 4, the inspection apparatus may 400 includes a radiation source 410 configured to emit a primary radiation beam Rp. In some embodiments, the radiation source 410 is positioned beside the wafer W, such that the radiation source 410 is substantially laterally aligned with the wafer W. In this way, the trajectory of the primary radiation beam Rp emitted from the radiation source 410 is substantially aimed at a bevel of the wafer W. For example, during the operation 106, the supporters 404 may be moved along the z-axis so as to align the wafer W with the radiation source 410.

In some embodiments, the radiation beam Rp may be a monochromatic light. For example, a suitable monochromatic light source may be a gas laser or a solid state laser diode. In some alternative embodiments, the radiation source may be configured to emit electromagnetic radiation of multiple wavelengths, which may include ultraviolet light, visible light, infra-red light, X-rays, gamma rays, microwaves, or radio-frequencies. In addition, the radiation source may be configured to emit another source of radiation source such as a beam of electrons, protons, neutrons, ion, or molecules. For example, a thermal field emission source is typically used as an electron source.

The primary radiation beam Rp is directed to an optical component 420. In some embodiments, the optical component 420 includes a beam splitter 422 and a reflector 424. The beam splitter 422, which may be a prism or a dichroic mirror, is disposed on an initial path by which the primary radiation beam Rp propagates to the optical component 420 for splitting the primary radiation beam Rp into a first radiation beam R1 and a second radiation beam R2. For example, the beam splitter 422 is configured to transmit the first radiation beam R1, and to reflect second radiation beam R2 at a substantially normal angle of incidence (e.g., about 90°). The first radiation beam R1 travels to the reflector 424 of the optical component 420 and is reflected by the reflector 424, thereby directing its propagation path to a direction (e.g., z direction) that is at a substantially normal angle of the incident direction of the primary radiation beam Rp (e.g., −x direction). In some embodiments, the reflector 424 may be a mirror. In some other embodiments, the reflector 424 may be a prism that has a total reflection surface. On the other hand, the second radiation beam R2, which is reflected by the beam splitter 422, propagates to a direction (e.g., −z direction) that is at a substantially normal angle of the incident direction of the primary radiation beam Rp (e.g., −x direction). Thus, the optical component 420 is configured to split the primary radiation beam Rp into the first radiation beam R1 and the second radiation beam R2 that propagate in opposite directions (e.g., z direction and −z direction).

With respect to the first radiation beam R1, after leaving the optical component 420, the first radiation beam R1 propagates to a reflector assembly 430 so as to direct the first radiation beam R1 to the front side $W_F$ of the wafer W. That is, the reflector assembly 430 optically couples the optical component 420 to the front side $W_F$ of the wafer W (or the wafer occupiable zone Z). The reflector assembly 430 is disposed above the wafer W. In some embodiments, the reflector assembly 430 is a trombone mirror unit (TMU) that includes a set of reflectors 432 and 434 that have reflective surfaces and that are disposed at about 90 degrees with respect to one another. In some embodiments, the reflectors 432 and 434 may be mirrors. In some other embodiments, the reflectors 432 and 434 may be prisms that have total reflection surfaces. The first radiation beam R1 travels to and reflected by the reflector 432, thereby changing its propagation path at a substantially normal angle of incidence (e.g., about 90°). Then, the first radiation beam R1 reflected by the reflector 432 therefore travels to and reflected by the reflector 434, thereby changing its propagation path at a substantially normal angle of incidence (e.g., about 90°). Accordingly, the first radiation beam R1 is directed to the front side $W_F$ of the wafer W.

Before the first radiation beam R1 reaches the wafer W, the first radiation beam R1 transmits through a beam splitter 450 that is disposed between the reflector assembly 430 and the wafer W. In some embodiments, the beam splitter 450 may be a prism or a dichroic mirror. The first radiation beam R1 may pass through the beam splitter 450 to the wafer W and is reflected by the wafer W. Then, the first radiation beam R1 reflected from the wafer W propagates back to the beam splitter 450 to change its propagation path at a substantially normal angle of incidence (e.g., 90°), thereby directing the first radiation beam R1 to an optical detector 470.

The optical detector 470 is configured to receive the signal of the first radiation beam R1 reflected from the front side $W_F$ of the wafer W and to generate an output, such as images, based on the received signal. That is, the optical detector 470 is optically coupled to the front side $W_F$ of the wafer W (or the wafer occupiable zone Z). In some embodiments, the optical detector 470 is a time delay and integration (TDI) sensor, which includes imaging technique that uses an area array image sensor to capture images from an imaging platform that is moving relative to the imaged object or scene. The computer system may use suitable method and/or algorithm to detect defects on the front side $W_F$ of the wafer W.

The inspection results of the wafer W, such as image, may be acquired using suitable inspection process and suitable inspection system such as those described herein. For example, the results of the inspection that may be used by the embodiments described herein may be generated by various inspection technologies including bright-field (BF), dark field (DF), and electron beam inspection technologies. The inspection results may also include information generated during inspection of the wafer or by an inspection system used to inspect the wafer. For example, the inspection results may include a defect locations reported by the inspection system, defect sizes reported by the inspection system, images of the defects such as patch images generated by the inspection system, or any other output generated by the inspection system.

With respect to the second radiation beam R2, after leaving the optical component 420, the second radiation beam R2 propagates to a reflector assembly 440 so as to direct the second radiation beam R2 to the back side $W_B$ of the wafer W. That is, the reflector assembly 440 optically couples the optical component 420 to a back side $W_B$ of the wafer W (or the wafer occupiable zone Z). The reflector assembly 440 is disposed below the wafer W. In some embodiments, the reflector assembly 440 is a trombone mirror unit (TMU) that includes a set of reflectors 442 and 444 that have reflective surfaces and that are disposed at 90 degrees with respect to one another. In some embodiments, the reflectors 442 and 444 may be mirrors. In some other embodiments, the reflectors 442 and 444 may be prisms that have total reflection surfaces. The second radiation beam R2 travels to and reflected by the reflector 442, thereby changing its propagation path at a substantially normal angle of incidence (e.g., about 90). Then, the second radiation beam R2 reflected by the reflector 442 therefore travels to and reflected by the reflector 444, thereby changing its propagation path at a substantially normal angle of incidence (e.g., about 90°). Accordingly, the second radiation beam R2 is directed to the back side $W_B$ of the wafer W. In some embodiments, the distance D1 between the reflector assembly 430 and the wafer W is substantially the same as the distance D2 between the reflector assembly 440 and the wafer W. In some embodiments, the distance D3 between the reflector assembly 430 and the optical component 420 is substantially the same as the distance D4 between the reflector assembly 440 and the optical component 420.

Before the second radiation beam R2 reaches the wafer W, the second radiation beam R2 transmits through a beam splitter 460 that is disposed between the reflector assembly 440 and the wafer W. In some embodiments, the beam splitter 460 may be a prism or a dichroic mirror. The second radiation beam R2 may pass through the beam splitter 460 to the wafer W and is reflected by the wafer W. Then, the second radiation beam R2 reflected from the wafer W propagates back to the beam splitter 460 to change its propagation path at a substantially normal angle of incidence (e.g., about 90), thereby directing the second radiation beam R2 to an optical detector 480.

The optical detector 480 is configured to receive the signal of the second radiation beam R2 reflected from the back side $W_B$ of the wafer W and to generate an output, such as images, based on the received signal. That is, the optical detector 480 is optically coupled to the back side $W_B$ of the wafer W (or the wafer occupiable zone Z). The optical detector 480 is the same or similar to the optical detector 470 described above, and thus relevant details in this regard will not be repeated hereinafter.

In some embodiments, during the inspection, the wafer W may be moved along a plane (e.g., the x-y plane in FIG. 4) that is substantially orthogonal to the incident beam (e.g., the first and second radiation beam R1 and R2), so as to scan over the entire surfaces of the wafer W for obtaining information over the whole wafer W. In other words, the wafer W may be moved along a plane that is substantially parallel to the front side $W_F$ (or back side $W_B$) of the wafer F. In some embodiments, the wafer W may be moved by controlling the position of the supporters 404 via a controller (not shown). In some embodiments, the wafer W is moved by linearly sliding the supporter 404. As shown in FIG. 4, in some embodiments, the first radiation beam R1 projected onto the wafer W is substantially aligned with the second radiation beam R2 projected onto the wafer W, so as to inspect overlapping places at opposite sides of the wafer W.

As described above, the primary radiation beam Rp emitted from the radiation source 410 is split into the first and second radiation beams R1 and R2, in which the first radiation beam R1 is directed to the front side $W_F$ of the wafer W for inspection, and the second radiation beam R2 is directed to the back side $W_B$ of the wafer W for inspection, respectively. Stated another way, the radiation beams respectively directed onto the front side $W_F$ and the back side $W_B$ of the wafer W originate from the same radiation source (e.g., the radiation source 410). In this way, the front side $W_F$ and the back side $W_B$ of the wafer W may be inspected at the same time. That is, the front side $W_F$ and the back side $W_B$ of the wafer W are simultaneously inspected, which in turn will reduce the inspection time.

Referring back to FIG. 1, as mentioned above, the operation 108 includes operations 1082 and 1084. In some embodiments, the operation 1084 includes inspecting an edge of the wafer. Referring to FIG. 4, the inspection apparatus 400 includes an edge inspection device 490 which is arranged beside the wafer W such that the edge inspection device 490 can inspect an outer edge E of a wafer W. Examples of defects that may be found on the outer edge E of wafers include, but are not limited to, chips, cracks, scratches, marks, particles, and residual chemicals. In some embodiments, the edge inspection device 490 is in an arc-shape and includes a center of curvature C. The center of curvature C is substantially level with the wafer W (or the wafer occupiable zone Z), the optical component 420, and the radiation source 410.

In some embodiments, the edge inspection device 490 may have a fixed position with respect to the wafer W. Then, the edge inspection device 490 may inspect substantially the entire outer edge E of the wafer W by rotating the wafer W in a 360-degree manner using the supporters 404. For example, the wafer supporters 404 revolve 360 degrees around a wafer occupiable zone Z defined by the supporters 404 and occupied by the wafer W. In this way, the wafer W can be rotated in a 360-degree manner. In other embodiments, the edge inspection device 490 may be configured to revolve 360 degrees around the wafer W to inspect substantially the entire outer edge E of the wafer W. The edge inspection device 490 is configured to generate an output, such as images of the outer edge of the wafer W. In some embodiments where operation 1082 is performed prior to operation 1084, the wafer W is rotated prior to generating images from the edge inspection device 490 and after generating images from the optical detectors 470 and 480. In some other embodiments where operation 1084 is performed prior to operation 1082, the wafer W is rotated during generating images from the edge inspection device 490, and the rotation is stopped prior to generating images from the optical detectors 470 and 480.

Figure 5:
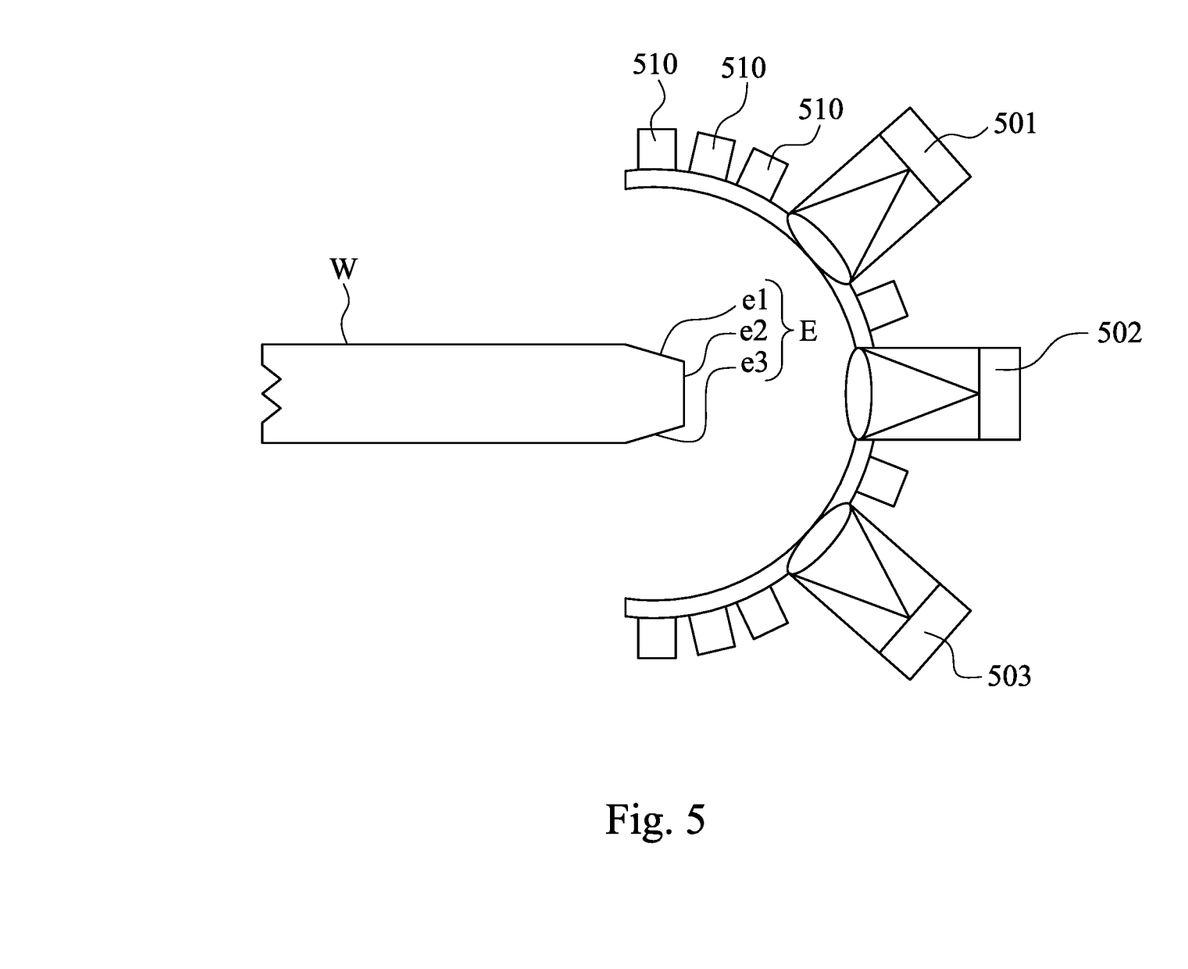
FIG. 5 is an edge inspection device in accordance with some embodiments of the present disclosure.

Referring to FIG. 5, shown there is an example of the edge inspection device 490. In some embodiments, the edge E of the wafer W includes bevels e1 to e3. The edge inspection device 490 may include a plurality of image sensors 501 to 503, in which the image sensors 501 to 503 placed at a different angle with respect to the wafer W. In some embodiments, the image sensors 501 to 503 are configured to capture images from the bevels e1 to e3 of the wafer W, respectively. The edge inspection device 490 further includes a plurality of light sources 510 distributed around the image sensors 501 to 503, so as to illuminates the bevels e1 to e3. In some embodiments, the image sensors 501 to 503 may be cameras. In some embodiments, the light sources 510 may be LED's (light emitting diodes), one or more light sources coupled with fiber optics, such as halogen lamps, diode lasers, or other suitable devices.

As mentioned above, the operation 1082 is performed to inspect the front side and back side of the wafer simultaneously, and the operation 1084 is performed to inspect the edge of the wafer. In some embodiments, the operation 1084 is performed once the operation 1082 is finished. In some other embodiments, the operation 1082 is performed once the operation 1084 is finished. Because the detectors 470 and 480 and the edge inspection device 490 are integrated in the same inspection apparatus 400, the operations 1082 and 1084 can be performed without moving the wafer W away from the inspection apparatus 400. That is, the front side, back side, and the edge of the wafer W can be inspected in the same inspection apparatus 400, which in turn will reduce process time. In some embodiments, the interval between the operations 1082 and 1084 is in a range from about 0.001 second to about 0.1 second.

Referring to FIG. 1, the method 100 proceeds to operation 110 where inspection results are stored. In FIG. 4, a computer system 500, which is electrically connected to the detectors 470, 480, and the edge inspection device 490, may be configured to receive the inspection results from the detectors 470, 480, and the edge inspection device 490. Then, the inspection results of the wafer W are stored in the computer system 500, so as to provide users for determining whether defects are presented on the wafer W. In some embodiments, the computer system 500 may take various forms, including a personal computer system, mainframe computer system, workstation, image computer, parallel processor, or other suitable devices. In general, the term "computer system" may be broadly defined to encompass device having one or more processors, which executes instructions from a memory medium.

Referring back to FIG. 1, the method 100 proceeds to operation 112 where the wafer W is unloaded from the inspection apparatus 400.

The method 100 proceeds to operation 114 by determining whether the inspection results are acceptable. As mentioned above, the detectors 470, 480, and the edge inspection device 490 in FIG. 4 inspect the wafer W and output the inspection results to the computer system 500, respectively. In some embodiments, the inspection results includes images of the front side $W_F$, the back side $W_B$, and the edge E of the wafer W. For example, the computer system 500 can determine whether the counted number or sizes of defects, which present on the wafer W, exceed a threshold value. The threshold value may be a predetermined data stored in a memory associated with the computer system 500. The inspection results of the wafer W can be determined as acceptable if the counted number or sizes of the defects do not exceed the threshold value. On the contrary, the inspection results of the wafer W can be determined as unacceptable if the counted number or sizes of the defects exceed the threshold value. In some other embodiments, the inspection results can be determined manually. That is, users can manually evaluate whether the inspection results (e.g., the images of the wafer W) are acceptable. It is noted that, in the discussion, the "acceptable" condition indicates all of the inspection results are acceptable. However, the "unacceptable" condition indicates at least one of the inspection results from the detectors 470, 480, and the edge inspection device 490 of FIG. 4 is unacceptable.

If the inspection results are acceptable, the method 100 proceeds to operation 116 where the wafer is transferred to another processing apparatus. The wafer W of FIG. 4 is transferred to another processing apparatus. In some embodiments, such processing apparatus can be the same or similar to the process apparatus described in FIG. 2, which may include etch apparatus, chemical vapor deposition (CVD) chamber, physical vapor deposition (PVD) chamber, atomic layer deposition (ALD) chamber, plasma enhanced chemical vapor deposition (PECVD) chamber, liquid source misted chemical deposition (LSMCD) chamber, furnace chamber, lithography apparatus, chemical mechanism polishing (CMP) apparatus, and/or other suitable apparatus.

If the inspection results are unacceptable, the method 100 proceeds to operation 118 where an enhanced inspection is performed to the wafer. In some embodiments, if the inspection results described in operation 108 and FIG. 4 are unacceptable, it indicates that the defects presented on the wafer W are unacceptable. In this regard, an enhanced inspection may be performed, which involve generating additional information about defects on the wafer W at a higher resolution using either a high magnification optical microscope (OM) or a scanning electron microscope (SEM). The higher resolution data for the defects generated by defect review is more suitable for determining attributes of the defects such as profile, roughness, more accurate size information, etc. In some embodiments, if the unacceptable inspection results are defects on the front side $W_F$ of the wafer W of FIG. 4, the enhanced inspection is performed by using scanning electron microscope. Because the relative small devices, such as transistors, are formed on the front side $W_F$ of the wafer W, the scanning electron microscope (SEM) can produce a much higher resolution image of the wafer W, so as to provide a more detail information of the defects. On the other hand, if the inspection results are defects on the back side $W_B$ and/or edge E of the wafer W of FIG. 4, the enhanced inspection is performed by using high magnification optical microscope (OM). In some embodiments where the inspection results are images, the inspection results of operation 108 have lower image resolution than the inspection results of operation 118.

In some embodiments, a defect analysis may also be performed using a system such as an electron dispersive x-ray spectroscopy (EDS) system. Such defect analysis may be performed to determine information such as composition of the defects. Attributes of the defects determined by inspection, review, analysis, or some combination thereof can be used to identify the type of the defect (i.e., defect classification) and possibly a root cause of the defects. This information can then be used to monitor and alter one or more parameters of one or more semiconductor fabrication processes to reduce or eliminate the defects.

Referring to FIG. 1, the method 100 proceeds to operation 120 where the wafer is transferred to another processing apparatus and the inspection results are reported. The wafer W of FIG. 4 is transferred to another processing apparatus. Meanwhile, the inspection results is reported, such that the condition of the wafer W can be taken into account during the fabrication process, and therefore alter one or more parameters of the fabrication process to obtain an acceptable process performance. Here, the inspection results include the inspection results from operations 108 and 118. In some embodiments, the processing apparatus can be the same or similar to the process apparatus described in FIG. 2, which may include etch apparatus, chemical vapor deposition (CVD) chamber, physical vapor deposition (PVD) chamber, atomic layer deposition (ALD) chamber, plasma enhanced chemical vapor deposition (PECVD) chamber, liquid source misted chemical deposition (LSMCD) chamber, furnace chamber, lithography apparatus, chemical mechanism polishing (CMP) apparatus, and/or other suitable apparatus.

According to the aforementioned embodiments, it can be seen that the present disclosure offers advantages in fabricating semiconductor devices. It is understood, however, that other embodiments may offer additional advantages, and not all advantages are necessarily disclosed herein, and that no particular advantage is required for all embodiments. One advantage is that a front side and a back side of a wafer can be inspected at the same time by using the same radiation source. Another advantage is that a front side inspection device, a back side inspection device, and an edge inspection device are integrated in the same system, and therefore the inspection time can be reduced.

In some embodiments of the present disclosure, a method includes generating a primary radiation beam from a radiation source; splitting the primary beam into a first radiation beam and a second radiation beam; directing the first radiation beam onto a front side of a wafer; directing the second radiation beam onto a back side of a wafer; generating an image of the front side of the wafer by receiving a reflection of the first radiation beam reflected from the wafer; and generating an image of the back side of the wafer by receiving a reflection of the second radiation beam reflected from the wafer.

In some embodiments of the present disclosure, a method includes transferring a wafer into an inspection apparatus; generating a first image of a front side of the wafer; generating a second image of a back side of the wafer, in which generating the first and second images are performed simultaneously; generating a third image of an edge of the wafer; and unloading the wafer from the inspection apparatus.

In some embodiments of the present disclosure, an apparatus includes a plurality of wafer supporters, a radiation source, a beam splitter; a first reflector assembly, a second reflector assembly, a first optical detector, and a second optical detector. The wafer supporters define a wafer occupiable zone thereon. The radiation source is aimed at the wafer occupiable zone. The beam splitter is between the radiation source and the wafer occupiable zone. The first reflector assembly optically couples the beam splitter to a front side of the wafer occupiable zone. The second reflector assembly optically couples the beam splitter to a back side of the wafer occupiable zone. The first optical detector is optically coupled to the front side of the wafer occupiable zone. The second optical detector is optically coupled to the back side of the wafer occupiable zone.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
generating a primary radiation beam from a radiation source;
splitting the primary radiation beam into a first radiation beam and a second radiation beam such that the first radiation beam and the second radiation beam propagate in opposite directions;
directing the first radiation beam onto a front side of a wafer;
directing the second radiation beam onto a back side of the wafer;
generating an image of the front side of the wafer by receiving a reflection of the first radiation beam reflected from the wafer; and
generating an image of the back side of the wafer by receiving a reflection of the second radiation beam reflected from the wafer.

2. The method of claim 1, wherein generating the primary radiation beam is performed such that a trajectory of the primary radiation beam is aimed at an edge of the wafer.

3. The method of claim 1, wherein directing the first radiation beam and directing the second radiation beam are performed such that the first radiation beam directed onto the front side of the wafer is substantially aligned with the second radiation beam directed onto the back side of the wafer.

4. The method of claim 1, wherein generating the image of the front side of the wafer comprises moving the wafer along a plane that is substantially parallel to the front side of the wafer.

5. The method of claim 1, further comprising generating an image of an edge of the wafer using an edge inspection device.

6. The method of claim 5, wherein generating the image of the edge of the wafer comprising rotating the wafer.

7. The method of claim 5, wherein generating the image of the edge of the wafer comprising revolving the edge inspection device around the edge of the wafer.

8. The method of claim 1, wherein generating the image of the front side of the wafer and generating the image of the back side of the wafer are performed simultaneously.

9. A method, comprising:
transferring a wafer into an inspection apparatus;
directing a first radiation beam to a front side of the wafer and a second radiation beam to a backside of the wafer, wherein the first radiation beam directed onto the front side of the wafer is substantially aligned with the second radiation beam directed onto the back side of the wafer;
generating a first image of the front side of the wafer by receiving a reflection of the first radiation beam reflected from the wafer;
generating a second image of a back side of the wafer by receiving a reflection of the second radiation beam reflected from the wafer, wherein generating the first and second images are performed simultaneously;
generating a third image of an edge of the wafer; and
unloading the wafer from the inspection apparatus.

10. The method of claim 9, wherein generating the first image is performed prior to generating the third image.

11. The method of claim 10, further comprising:
rotating the wafer prior to generating the third image and after generating the first image.

12. The method of claim 9, wherein generating the first image is performed after generating the third image.

13. The method of claim 12, further comprising:
rotating the wafer during generating the third image; and
stop rotating the wafer prior to generating the first image.

14. The method of claim 9, further comprising:
determining whether the first image is acceptable; and
generating a fourth image of the front side of the wafer in response to the first image being determined unacceptable.

15. The method of claim 14, wherein the fourth image has a higher image resolution than the first image.

16. The method of claim 9, wherein generating the first image comprises providing a first radiation beam to the wafer and receiving a reflection of the first radiation beam reflected from the wafer,
generating the second image comprises providing a second radiation beam to the wafer and receiving a reflection of the second radiation beam reflected from the wafer,
and wherein the first radiation beam and the second radiation beam are provided from the same radiation source.

17. An apparatus, comprising:
a plurality of wafer supporters defining a wafer occupiable zone thereon;
a radiation source aimed at the wafer occupiable zone;
a beam splitter between the radiation source and the wafer occupiable zone;
a first reflector assembly optically coupling the beam splitter to a front side of the wafer occupiable zone;
a second reflector assembly optically coupling the beam splitter to a back side of the wafer occupiable zone;
a first optical detector optically coupled to the front side of the wafer occupiable zone;
a second optical detector optically coupled to the back side of the wafer occupiable zone; and
an edge inspection device having a center of curvature substantially level with the beam splitter.

18. The apparatus of claim 17, wherein the edge inspection device is revolvable.

19. The apparatus of claim 17, wherein the wafer supporters are revolvable.

20. The apparatus of claim 17, wherein the edge inspection device comprises a plurality of image sensors.

* * * * *